(12) United States Patent
Jordan et al.

(10) Patent No.: US 8,307,861 B2
(45) Date of Patent: Nov. 13, 2012

(54) PROCESSES AND SYSTEMS FOR TRANSFERRING PARTICULATE SUBSTANCES FROM CONTAINERS

(75) Inventors: Alfred F Jordan, Arnold, MD (US); Lenny L. Albin, Sr., Sulphur, LA (US); Charles A Cross, McLean, VA (US)

(73) Assignee: W R Grace & Co -Conn., Columbia, MD (US)

( * ) Notice: Subject to any disclaimer, the term of this patent is extended or adjusted under 35 U.S.C. 154(b) by 0 days.

(21) Appl. No.: 13/192,057

(22) Filed: Jul. 27, 2011

(65) Prior Publication Data

US 2011/0278330 A1     Nov. 17, 2011

Related U.S. Application Data

(62) Division of application No. 11/407,793, filed on Apr. 19, 2006, now Pat. No. 8,016,000.

(51) Int. Cl.
*B65B 1/04* (2006.01)

(52) U.S. Cl. ............... 141/65; 141/8; 141/98; 141/374; 141/375

(58) Field of Classification Search .......... 141/65, 141/98, 369, 374, 375; 406/152, 197
See application file for complete search history.

(56) References Cited

U.S. PATENT DOCUMENTS

| | | | |
|---|---|---|---|
| 2,116,622 A | 5/1938 | Eisenmenger | 225/1 |
| 3,135,438 A | 6/1964 | Wex et al. | 222/400.7 |
| 3,752,362 A | 8/1973 | Risener | 222/85 |
| 3,850,582 A | 11/1974 | Luckenbach | 23/288 |
| 3,989,308 A | 11/1976 | Zimmermann et al. | 302/3 |
| 4,018,671 A | 4/1977 | Andon et al. | 208/152 |
| 4,054,784 A | 10/1977 | Ricciardi et al. | 364/479 |
| 4,108,336 A | 8/1978 | Anderson, Jr. | 222/148 |
| 4,191,223 A | 3/1980 | Bourgeois | 141/18 |
| 4,269,548 A | 5/1981 | Bennigsen-Mackiewicz et al. | 406/25 |
| 4,301,880 A | 11/1981 | Krambrock et al. | 177/189 |
| 4,311,492 A | 1/1982 | Eltvedt | 55/158 |
| 4,312,388 A | 1/1982 | Hager et al. | 141/1 |
| 4,345,858 A | 8/1982 | Barlow | 406/34 |
| 4,379,663 A | 4/1983 | Allison | 406/23 |
| 4,505,623 A | 3/1985 | Mulder | 406/114 |
| 4,557,637 A | 12/1985 | Barclay et al. | 406/153 |
| RE32,101 E | 4/1986 | Ricciardi et al. | 222/56 |

(Continued)

FOREIGN PATENT DOCUMENTS

DE           03413757       10/1985

(Continued)

OTHER PUBLICATIONS

Clemtex CIS-1440-LI-280, "Automatic Catalyst Injection System", Operation and Parts Manual, Clemtex® Sandblasting and Painting Equipment and Supplies, CLEM-00251-00277, 27 pages.

(Continued)

*Primary Examiner* — Gregory Huson
*Assistant Examiner* — Nicolas A Arnett
(74) *Attorney, Agent, or Firm* — Charles A. Cross

(57) ABSTRACT

Preferred processes are provided for unloading a particulate substance from a container using a cover system comprising a cover and a wand extending through the cover. The processes can include installing the cover system on the container so that the cover mates with the container and the wand extends into the particulate substance, connecting a pipe or a hose to the wand, and drawing the particulate substance through the wand and the pipe or hose.

12 Claims, 9 Drawing Sheets

U.S. PATENT DOCUMENTS

| | | | |
|---|---|---|---|
| 4,676,404 A | 6/1987 | Yamazaki et al. | 222/56 |
| 4,687,381 A | 8/1987 | Dumain et al. | 406/52 |
| 4,695,205 A | 9/1987 | Levin | 406/38 |
| 4,738,356 A | 4/1988 | Gunkel et al. | 206/524.3 |
| 4,741,368 A | 5/1988 | Crumby | 141/18 |
| 4,812,086 A | 3/1989 | Kopernicky | 406/153 |
| 4,880,142 A | 11/1989 | Higuchi et al. | 222/56 |
| 4,882,784 A | 11/1989 | Tump | 364/567 |
| 4,927,523 A | 5/1990 | Donnelly | 208/120 |
| 4,927,526 A | 5/1990 | Anderson et al. | 208/152 |
| 4,994,173 A | 2/1991 | Tai-Sheng et al. | 208/152 |
| 5,015,126 A | 5/1991 | Kramer | 406/152 |
| 5,037,246 A | 8/1991 | Okano et al. | 406/152 |
| 5,081,600 A | 1/1992 | Tump | 364/571.08 |
| 5,111,854 A | 5/1992 | Begley et al. | 141/65 |
| 5,230,374 A | 7/1993 | Dawson et al. | 141/231 |
| 5,240,683 A | 8/1993 | Maurel et al. | 422/135 |
| 5,260,880 A | 11/1993 | Tump | 364/479 |
| 5,262,578 A | 11/1993 | Hall | 588/249 |
| 5,265,653 A | 11/1993 | Herlth | 141/65 |
| 5,335,185 A | 8/1994 | Pitts et al. | 364/510 |
| 5,357,306 A | 10/1994 | Skye et al. | 354/324 |
| 5,389,236 A | 2/1995 | Bartholic et al. | 208/152 |
| 5,518,344 A | 5/1996 | Miller et al. | 406/39 |
| 5,690,450 A | 11/1997 | Miller et al. | 406/39 |
| 5,836,351 A | 11/1998 | Underwood, III | 137/587 |
| 5,878,793 A | 3/1999 | Siegele et al. | 141/63 |
| 5,890,868 A | 4/1999 | Comardo | 414/587 |
| 6,132,157 A | 10/2000 | Comardo | 414/160 |
| 6,358,401 B1 | 3/2002 | Evans | 208/152 |
| 6,375,039 B1 | 4/2002 | Anderson | 222/82 |
| 6,398,462 B1 | 6/2002 | Fulkerson | 406/134 |
| 6,474,372 B2 | 11/2002 | Sanderson et al. | 141/83 |
| 6,508,930 B1 | 1/2003 | Evans et al. | 208/113 |
| 6,527,141 B2 | 3/2003 | Sanders | 222/1 |
| 6,537,036 B1 | 3/2003 | Broerman et al. | 417/182.5 |
| 6,644,340 B2 | 11/2003 | Rokkjaer | 137/322 |
| 6,648,182 B2 | 11/2003 | Rauworth et al. | 222/400.7 |
| 6,681,813 B2 | 1/2004 | Baltes | 141/65 |
| 6,843,285 B2 | 1/2005 | Ozawa | 141/326 |
| 6,859,759 B2 | 2/2005 | Evans | 702/188 |
| 6,878,656 B2 | 4/2005 | Bartholic | 502/64 |
| 7,311,474 B1 | 12/2007 | Ogasahara et al. | 406/143 |
| 8,016,000 B2 | 9/2011 | Jordan et al. | 141/4 |
| 2001/0041117 A1 | 11/2001 | Comardo | 414/760 |
| 2002/0066746 A1 | 6/2002 | Sanders | 222/1 |
| 2003/0010387 A1 | 1/2003 | Rauworth et al. | 137/588 |
| 2003/0097243 A1 | 5/2003 | Mays et al. | 703/2 |
| 2003/0098320 A1 | 5/2003 | Phelps et al. | 222/400.7 |
| 2003/0111131 A1 | 6/2003 | Zhu et al. | 141/18 |
| 2004/0099572 A1 | 5/2004 | Evans | 208/113 |
| 2004/0102929 A1 | 5/2004 | Evans | 702/188 |
| 2004/0117158 A1 | 6/2004 | Evans | 702/188 |
| 2004/0166032 A1 | 8/2004 | Evans | 422/145 |
| 2004/0260487 A1 | 12/2004 | Evans | 702/50 |
| 2005/0103684 A1 | 5/2005 | Evan | 208/113 |
| 2005/0106079 A1 | 5/2005 | Evans | 422/130 |
| 2005/0214177 A1 | 9/2005 | Albin | 422/145 |

FOREIGN PATENT DOCUMENTS

| | | |
|---|---|---|
| EP | 0408606 | 9/1993 |
| WO | 89/07487 | 8/1989 |
| WO | 00/48723 | 8/2000 |

OTHER PUBLICATIONS

Clemtex SBC-4872-V Automatic Catalyst Injection System Operation and Parts manual, WRG-007768-007788, 21 pages.

IQ Plus 810, Digital Weight Indicator, Operating Manual, Rice Lake Weighing Systems, Feb. 15, 1993, WRG-052132-052248, 1-1, 14-13.

PLC-5 Family Programmable Controllers, Processor Manual, Allen Bradley, A Rockwell International Company, Chapter t thru Chapter 19.

Bulletin 1745 SLC™ Programmable Controllers, Allen Bradley, A Rockwell International Company, Nov. 1987, Publication 1745-800, Chapter 1-22.

PROCESSES AND SYSTEMS FOR TRANSFERRING PARTICULATE SUBSTANCES FROM CONTAINERS

CROSS REFERENCE TO RELATED APPLICATIONS

This application is a divisional of U.S. patent application Ser. No. 11/407,793 filed Apr. 19, 2006.

FIELD OF THE INVENTION

The present invention relates to the handling of particulate substances such as catalysts and additives used in fluid catalytic cracking (FCC) operations. More specifically, the invention relates to systems and processes that facilitate the transfer of particulate substances from containers while the containers are covered.

BACKGROUND OF THE INVENTION

FCC units used to conduct FCC operations commonly include a circulating inventory of bulk catalyst. The bulk catalyst is typically used to perform a primary function, such as producing naptha from petroleum feedstock, the naptha being further processed into gasoline. Additives, which are often in the same fluidizable and particulated form as the catalyst, are often introduced into the circulating inventory of bulk catalyst to perform a secondary function such as reducing certain types of emissions, e.g., SOx or NOx, produced by the FCC unit. These emissions are produced in the catalyst regenerator of the FCC unit where coke deposits from the cracked petroleum are burned off and the regenerated catalyst returned to the circulating catalyst inventory. These additives are usually introduced into the regenerator using an injection device commonly referred to as a "loader." Loaders are also used to add catalyst to the bulk inventory as additional catalyst becomes necessary due to factors such as attrition and deactivation.

Particulate substances, such as catalysts and additives used in FCC units, are usually shipped from the manufacturer to the point of use, e.g., a refinery, in containers. For example, catalysts and additives are commonly transported in standard 55-gallon drums capable of holding approximately 300 pounds of the catalyst or additive. Tote bins capable of holding approximately 2,000 pounds of catalyst or additive are another type of commonly-used shipping container.

The containers used to ship catalyst or additive are usually covered during shipping to prevent contamination of the catalyst or additive by oxygen or moisture from the ambient environment. Covering the containers is also necessary to prevent fugitive emissions and other losses of the catalyst or additive, and to reduce the potential for human contact with the potentially toxic or caustic catalyst or additive.

The catalyst or additive can be unloaded from the shipping container to a silo or other suitable storage vessel at the refinery. The unloading process is typically conducted by removing the cover of the container, and vacuuming the catalyst or additive. Removing the cover is necessary to prevent a substantial pressure differential from developing between the interior of the container and the ambient environment. A substantial pressure differential can potentially collapse or otherwise damage the container.

Vacuuming the catalyst or additive while the cover of the container is removed, however, exposes the catalyst or additive to the environment. Such exposure can be disadvantageous in applications where the contents of the container are subject to contamination when exposed to the ambient environment. For example, many catalysts and additives degrade when exposed to moisture. Exposure to moisture can be particularly disadvantageous when the catalyst or additive possesses hygroscopic, i.e., moisture absorbing, properties.

Moreover, particulate substances that possess pyrophoric, i.e., spark or flame inducing, properties can present a fire or explosion hazard when exposed to or released into the ambient environment. Also, some types of catalysts and additives can degrade when exposed to the oxygen normally present in the ambient environment.

Consequently, an ongoing need exists for systems and methods that can facilitate the unloading of particulate substances from containers while minimizing or substantially eliminating exposure of the particulate substances to the ambient environment.

SUMMARY OF THE INVENTION

Preferred processes and cover systems are provided that permit particulate substances to be unloaded from containers while the containers are covered.

Preferred processes are provided for unloading a particulate substance from a container using a cover system comprising a cover, a fitting attached to the cover, and a wand mounted on and in fluid communication with the fitting. The processes comprise installing the cover system on the container so that the cover mates with the container and the wand extends into the particulate substance, connecting a pipe or a hose to the fitting, and drawing the particulate substance through the wand, the fitting, and the pipe or hose.

Preferred processes for transferring catalyst and/or additive from a container to an injection device that injects the catalyst and/or additive into a fluid catalytic cracking unit comprise installing a cover on the container; inserting a wand into the catalyst and/or additive; placing the wand in fluid communication with a vacuum source of the injection device; and drawing the catalyst and/or additive from the container by way of the wand.

Preferred processes for transferring a particulate substance from a container to an injection device capable of injecting the particulate substance into a fluid stream comprise installing a cover on the container, and vacuuming the particulate substance through the cover and into the injection device.

Preferred cover systems for a container comprise a cover that mates with the container, a wand capable of being inserted through a hole formed in the cover, and a cradle for holding the container in a tilted orientation.

Preferred systems for introducing catalyst and/or additive into a fluid catalytic cracking unit comprise an injection device comprising a vacuum source and a chamber. The chamber is in fluid communication with the vacuum source, receives the catalyst and/or additive, and is capable of being pressurized to inject the catalyst and/or additive into the fluid catalytic cracking unit.

The systems also comprise a container defining a volume that holds the catalyst and/or additive, and a cover system. The cover system comprises a cover capable of mating with the container and further defining the volume, and a wand capable of extending through the cover and into the volume so that the wand is inserted in the catalyst and/or additive. The wand is in fluid communication with the vacuum source so that the catalyst and/or additive is drawn through the cover and into the injection device in response to a vacuum generated by the vacuum source.

BRIEF DESCRIPTION OF THE DRAWINGS

The foregoing summary, as well as the following detailed description of a preferred embodiment, are better understood when read in conjunction with the appended diagrammatic drawings. For the purpose of illustrating the invention, the drawings show an embodiment that is presently preferred. The invention is not limited, however, to the specific instrumentalities disclosed in the drawings. In the drawings.

DETAILED DESCRIPTION OF ILLUSTRATIVE EMBODIMENTS

Figure 1:
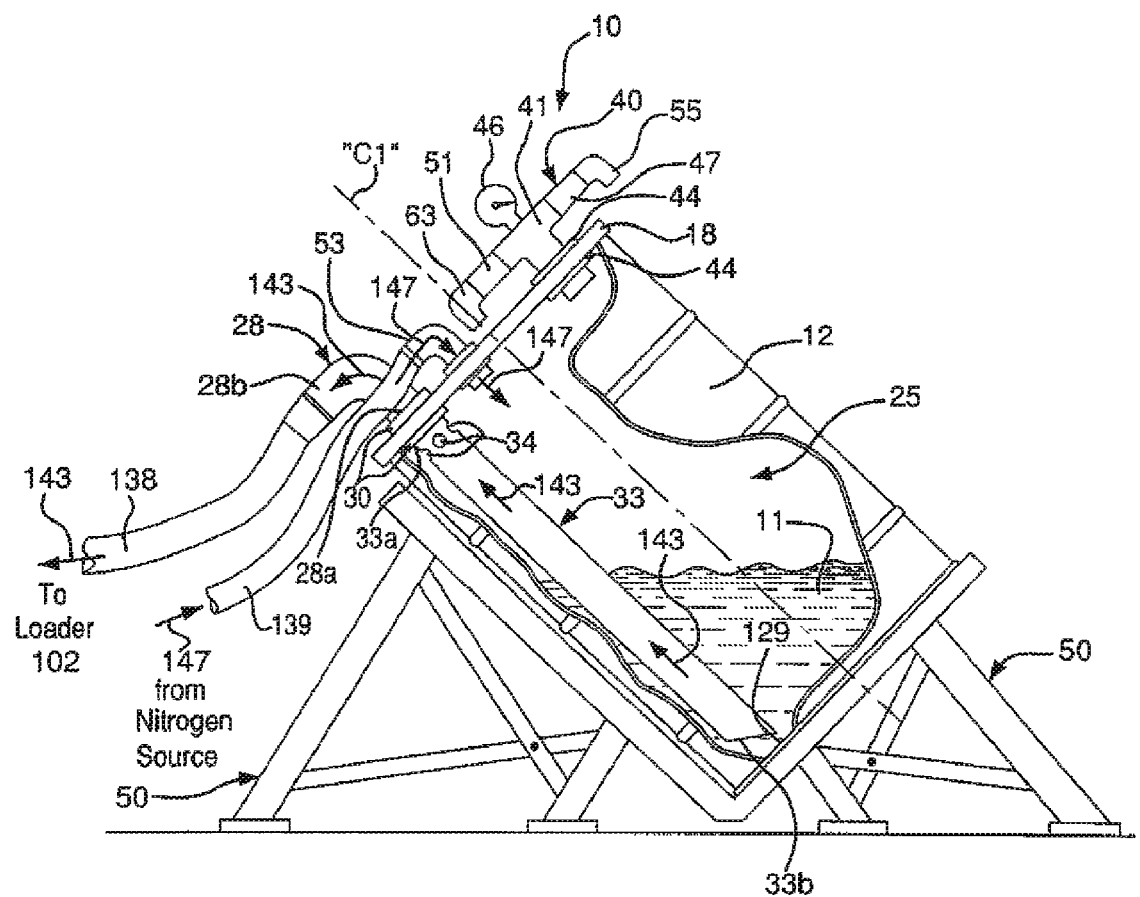
FIG. 1 is a side cutaway view of a preferred cover system installed on a barrel, with the barrel supported in a tilted orientation by a cradle.
Figure 2:
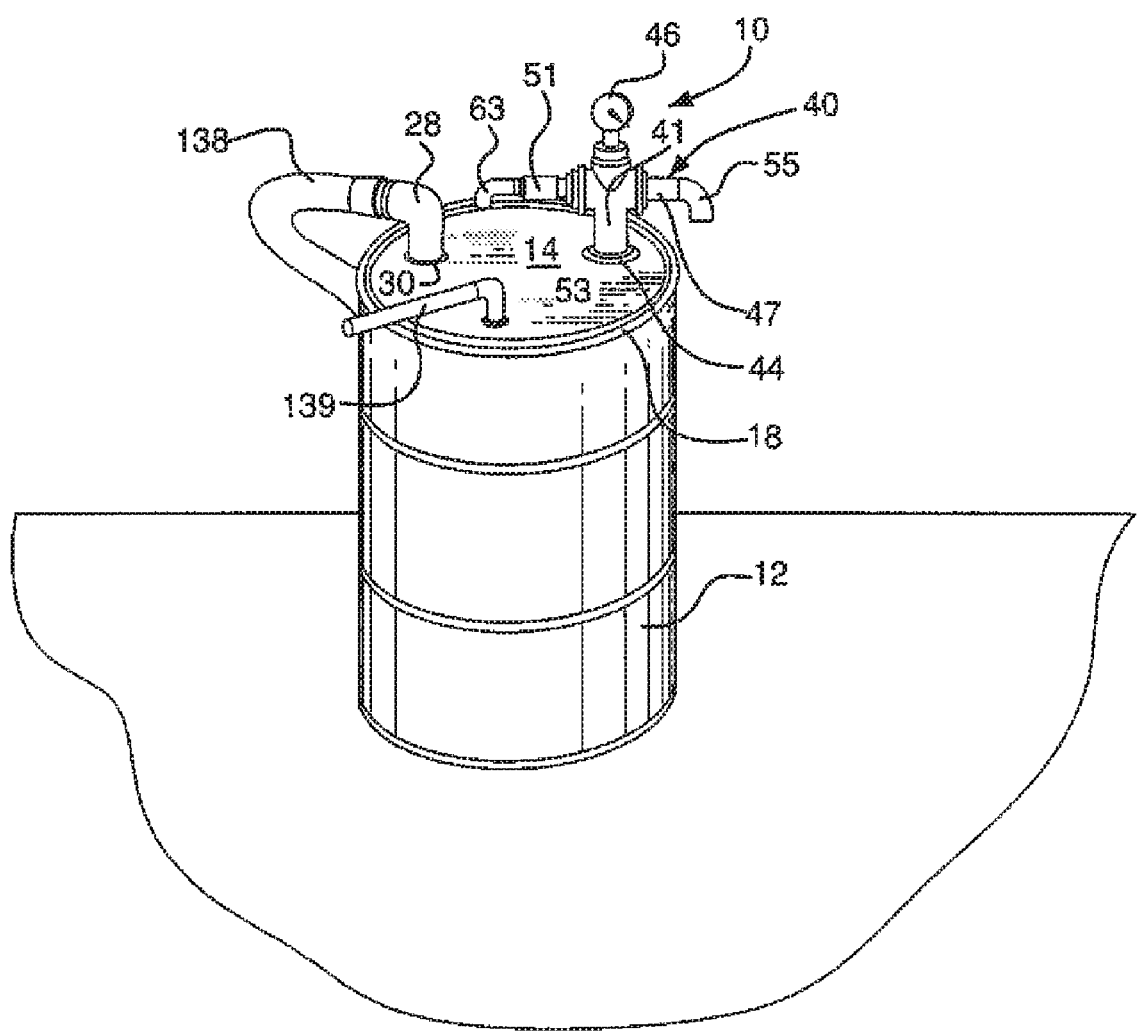
FIG. 2 is a top perspective view of the cover system and the barrel shown in FIG. 1, depicting a hose being mated with a fitting of the cover system.

FIGS. 1-8B depict a preferred cover system 10 for a container such as a drum 12. The cover system 10 can facilitate the transfer of a particulate substance from the drum 12. The drum 12 can be, for example, a standard 55-gallon drum. The particulate substance can be, for example, catalyst and/or additive 11 for use in an FCC unit (not shown). The catalyst and/or additive is depicted in FIG. 1 by the reference character 11.

The use of the cover system 10 in connection with the drum 12 is disclosed for exemplary purpose only. Alternative embodiments of the cover system 10 can be used with other types of containers, including tote bins, square or rectangular containers, and other types of containers having shapes and sizes different than those of a 55-gallon drum. Moreover, the cover system 10 can be used to facilitate the transfer of particulate substances other than catalysts and additives.

Figure 9:
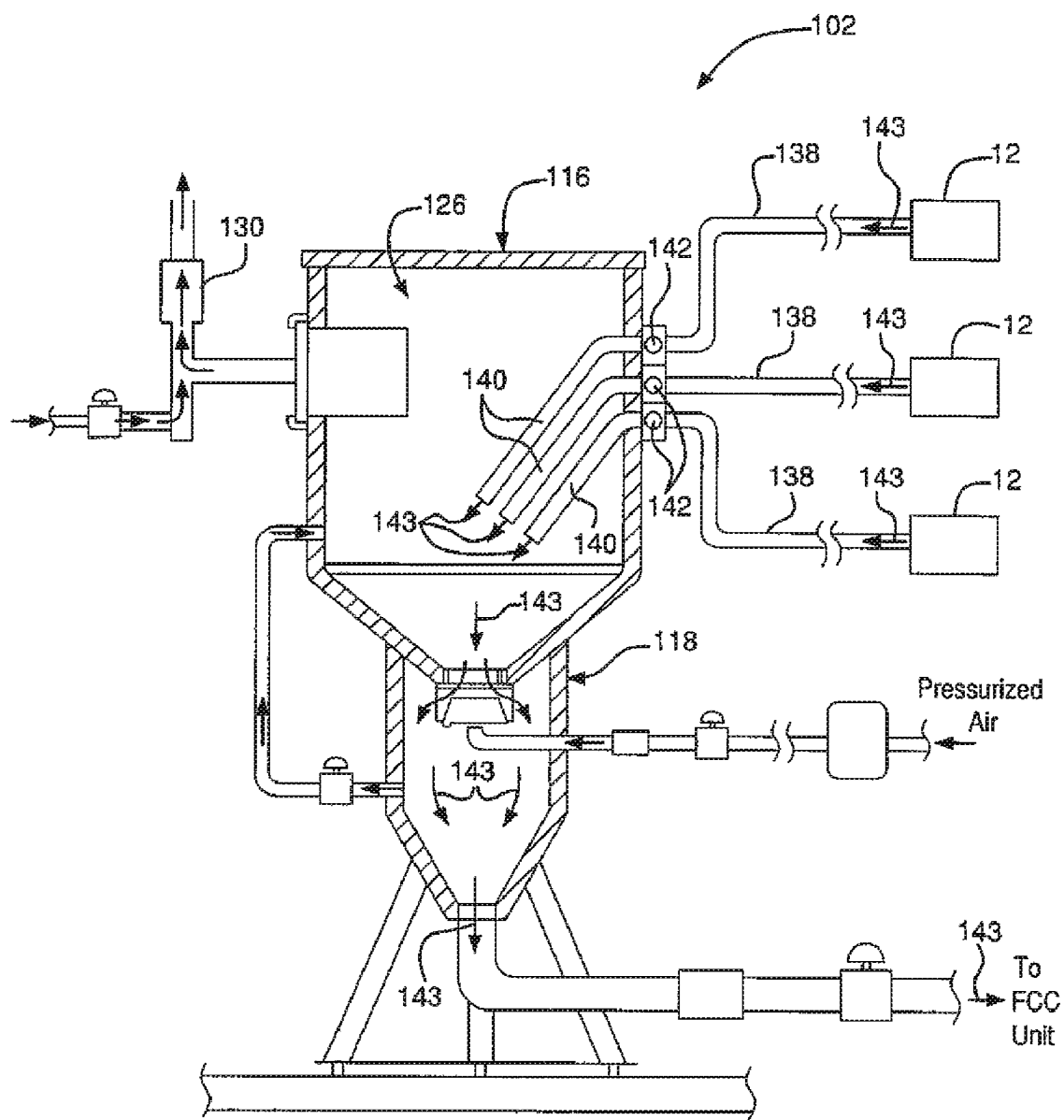
FIG. 9 is a cross-sectional side view of a loader that can vacuum a particulate substance from the barrel by way of the cover system shown in FIGS. 1-8A, and inject the particulate substance into an FCC unit.

The cover system 10 comprises a cover 14 configured to mate with the drum 12. The cover 14 and the interior of the drum 12 define an internal volume 25, as shown in FIG. 1. The cover system 10 allows the internal volume 25 to be placed in fluid communication with a vacuum source, such as an injection device in the form of a loader 102 depicted in FIG. 9. The vacuum generated by the loader 102 can draw the catalyst and/or additive 11 from the drum 12 and into the loader 102.

The loader 102 can then inject the catalyst and/or additive 11 into a regenerator of the FCC unit.

The loader 102 comprises a dust collector 116 and a transfer pot 118. The transfer pot 118 adjoins the dust collector 116, and is in fluid communication with the regenerator of the FCC unit on a selective basis. The loader 102 also comprises a vacuum producer 130 in fluid communication with the dust collector 116.

The dust collector 116 defines an internal volume 126. The dust collector 116 includes three pipe guides 140 that extend from a wall of the dust collector 116 and into the internal volume 126.

The internal volume 126 can be placed in fluid communication with three of the drums 12 by hoses 138 or other suitable means such as hard piping. Each hose 138 can be connected to the dust collector 116 by way of an associated valve 142 mounted on the dust collector 116. The inner diameter of each hose 138 is preferably approximately one to approximately five inches. More preferably, the inner diameter of each hose 138 is approximately two to approximately three inches. Preferred values for the inner diameter of the hoses 138 are presented for exemplary purpose only; the diameter of the hoses 138 can lie outside of the noted ranges.

Each pipe guide 140 is connected to an associated one of the valves 142. The valves 142 permit the associated hoses 138 and drums 12 to be isolated from the internal volume 126 on a selective basis. An internal or external manifold (not shown) can be used in lieu of the three separate valves 142 in alternative embodiments of the loader 102. Moreover, alternative embodiments of the loader 102 can be equipped with more or less than three valves 142 and three pipe guides 140.

The vacuum producer 130 generates a vacuum within the internal volume 126 of the dust collector 116. The vacuum draws the catalyst and/or additive 11 from one of the drums 12 when the associated valve 142 is open to permit the internal volume 126 to communicate with the drum 12.

The catalyst and/or additive 11 is discharged into the internal volume 126 of the dust collector 116 by the corresponding pipe guide 140 after passing through the associated hose 138 and valve 142. The path of the catalyst and/or additive 11 is denoted in FIG. 9 by arrows 143. The catalyst and/or additive 11 falls to the bottom of the dust collector 116 and into the transfer pot 118. The transfer pot 118 is subsequently pressurized, and the catalyst and/or additive 11 is injected into the regenerator of the FCC unit in response to the pressure within the transfer pot 118.

The operation of the loader 10, including opening and closing of the valves 142, pressurization of the transfer pot 118, generation of the vacuum in the dust collector 116, etc., can be controlled automatically by an electronic controller (not shown) of the loader 102.

Further details of a loader suitable for use as the loader 102 are included in U.S. application Ser. No. 10/806,563, filed Mar. 23, 2004, the contents of which is incorporated by reference herein in its entirety.

The preceding details of the loader 102 are presented for exemplary purposes only. The cover system 10 can be used to facilitate the transfer of particulate substances to systems and devices other than the loader 102. For example, the cover system 10 can be used to facilitate the transfer of particulate substances to delivery vehicles, reactor units, mixers, or storage containers. Moreover, the cover system 10 can be used to facilitate the transfer of particulate substances to loaders that can be connected to no more than one of the drums 12 at any one time.

Figure 3:
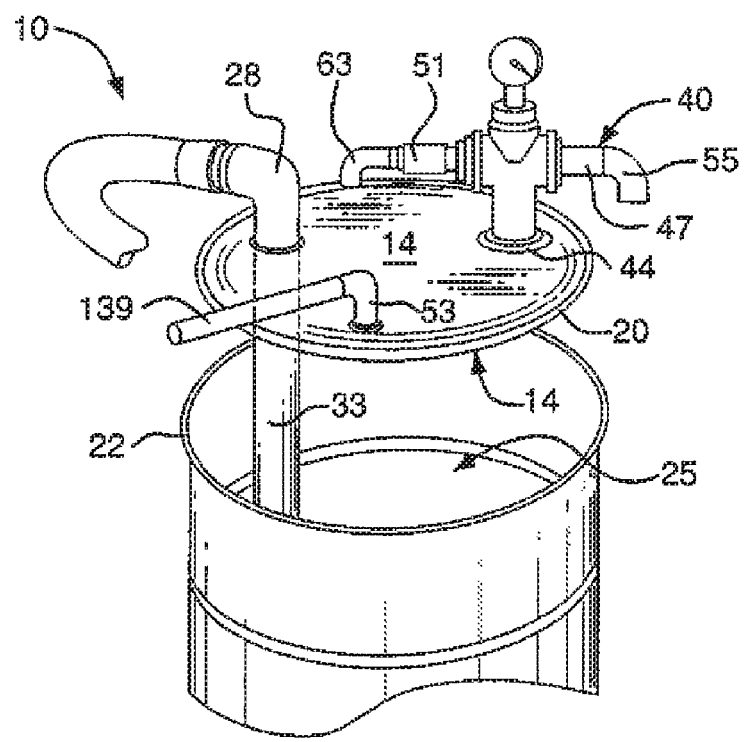
FIG. 3 is a top perspective view of the cover system and the barrel shown in FIGS. 1 and 2, depicting the cover system being lowered onto the barrel.
Figure 4:
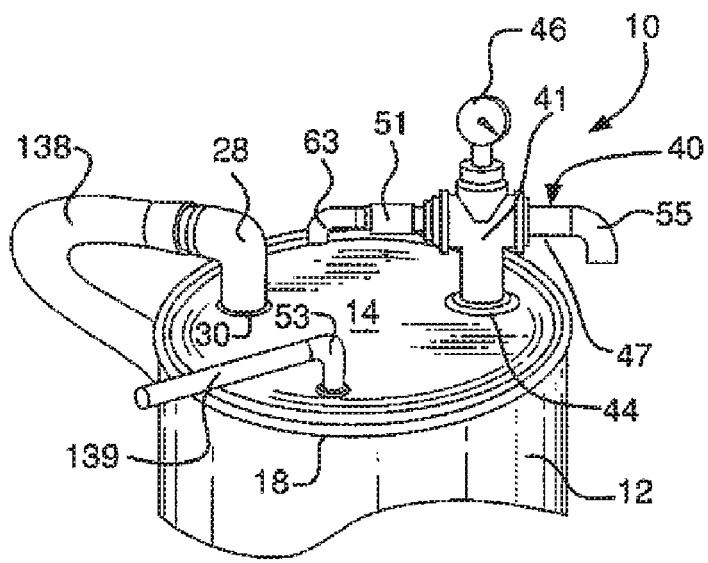
FIG. 4 is a top perspective view of the cover system and the barrel shown in FIGS. 1-3, depicting the cover system being secured to the barrel.
Figure 5:
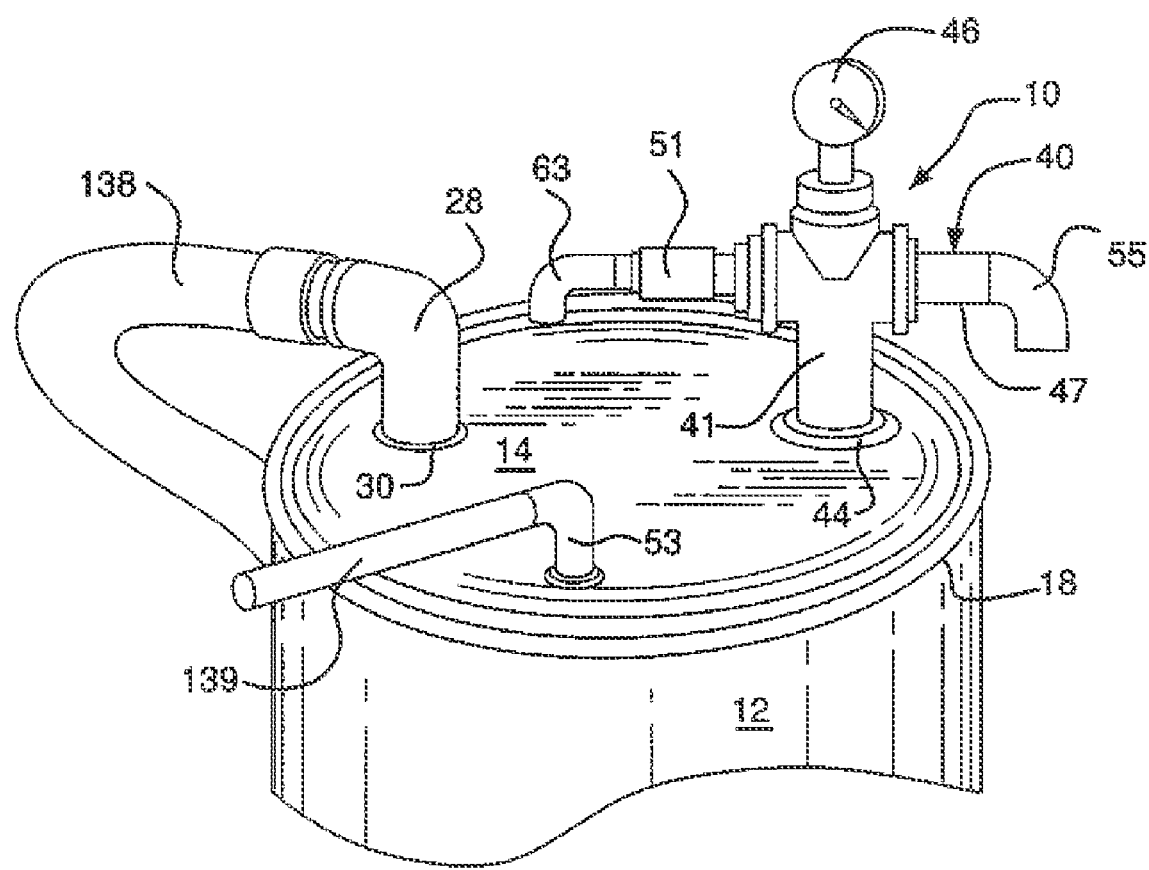
FIG. 5 is a top perspective view of the cover system and the barrel shown in FIGS. 1-4, depicting the cover system fully installed on the barrel.
Figure 6:
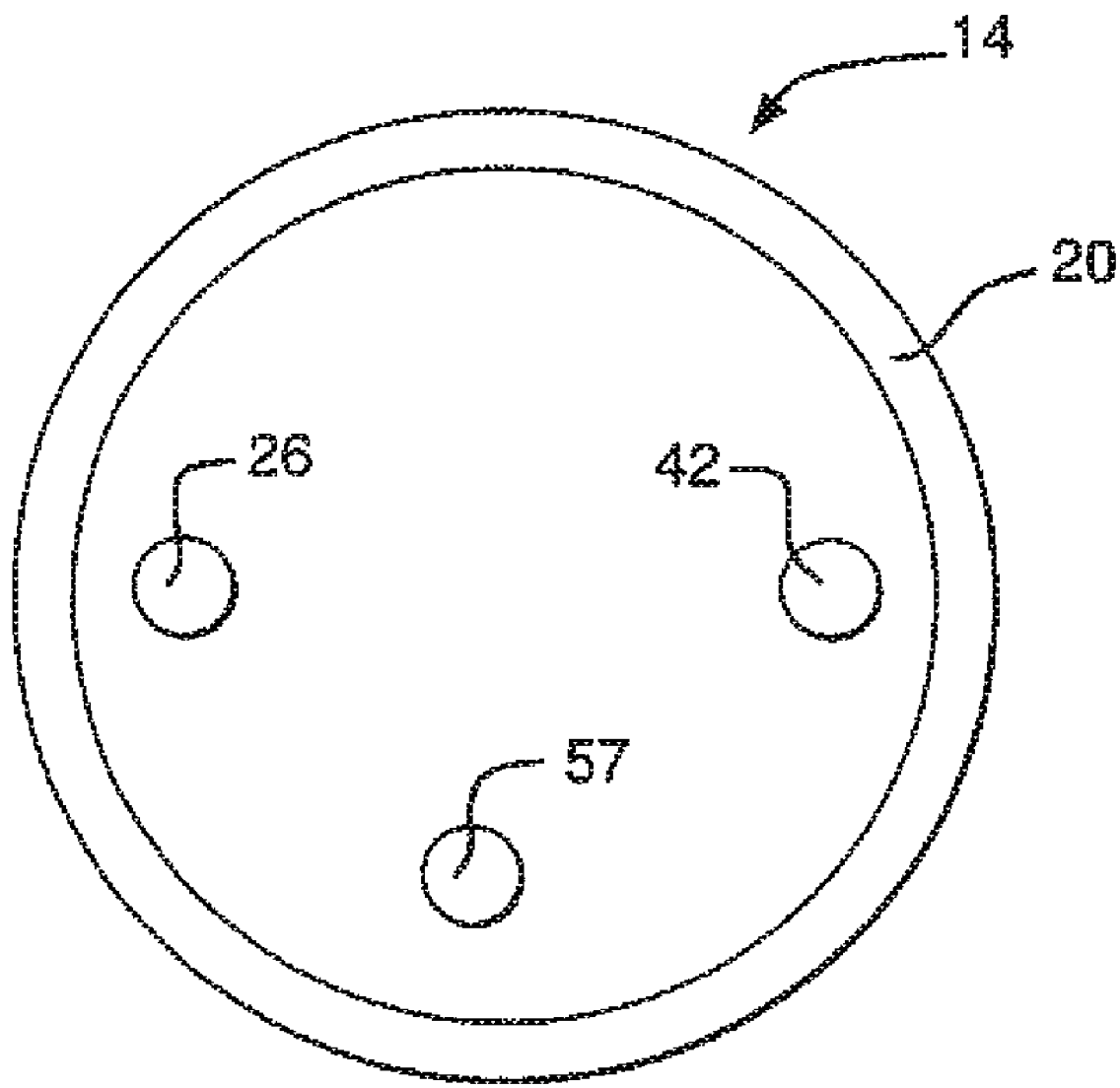
FIG. 6 is a top view of a cover of the cover system shown in FIGS. 1-5.

The cover 14 of the cover system 10 is configured to securely mate with the drum 12. In particular, the cover 14 has a lip 20 that engages a rim 22 formed around the upper edge of the drum 12. The lip 20 and the rim 22 are depicted in FIGS. 3 and 6. The cover system 10 can include a compression ring 18 that engages the lip 20 and the rim 22. The compression ring 18 can be tightened around the lip 20 and the rim 22 by a fastener or other suitable means that draws opposing ends of the compression ring 18 together. The compression ring 18, when tightened, drives the lip 20 and the ring 22 together, thereby securing the cover 14 to the drum 12 and substantially sealing the interface between the cover 14 and the drum 12.

The use of the compression ring 18 to secure the cover 14 to the drum 12 is disclosed for exemplary purposes only. Other types of securing means, such as fasteners or clamps, can be used in the alternative.

The cover system 10 includes features that permit the catalyst and/or additive 11 to be drawn out of the drum 12 while the cover 14 is installed on the drum 12. In particular, the cover 14 has a first penetration point or opening 26 formed therein. The first opening 26 is preferably located proximate an outer perimeter of the cover 14, as shown in FIG. 6.

The system 10 further includes a fitting 28 having a first end 28a and a second end 28b, as shown in FIG. 1. The fitting 28 has a flow path defined therein and extending between the first and second ends 28a, 28b. The diameter of the flow path can be approximately two inches. The optimal value for the diameter of the flow path is application dependent, and can vary with factors such as the maximum desired rate at which the catalyst and/or additive 11 is to be unloaded from the drum 12; a specific value for the diameter is disclosed for exemplary purposes only.

The fitting 28 is attached to the cover 14 so that the fitting 28 extends through the port 26, and a portion of the fitting 28 projects downward into the volume 25 when the cover 14 is mounted on the drum 12. The first end 28a of the fitting 28 is located within the volume 25, and the second end 28b is accessible from the exterior of the drum 12 and the cover 14 when the cover 14 is mated with the drum 12.

The fitting 28 can be attached to the cover 14 using threaded rings 30 that engage complementary threads formed on the fitting 28 as shown, for example, in FIG. 1. Gaskets (not shown) or other suitable means can be used to seal the interface between the rings 30, the cover 14, and the fitting 28. Other permanent, semi-permanent, and non-permanent means for securing the fitting 28 to the cover 14 can be used in the alternative; for example, a plastic insert that securely engages the fitting 28 and the periphery of the first opening 26 can be used in lieu of the threaded rings 30.

The fitting 28 is depicted as substantially elbow-shaped for exemplary purposes only. Fitting having other shapes, including substantially straight fittings, can be used in the alternative.

Figure 7:
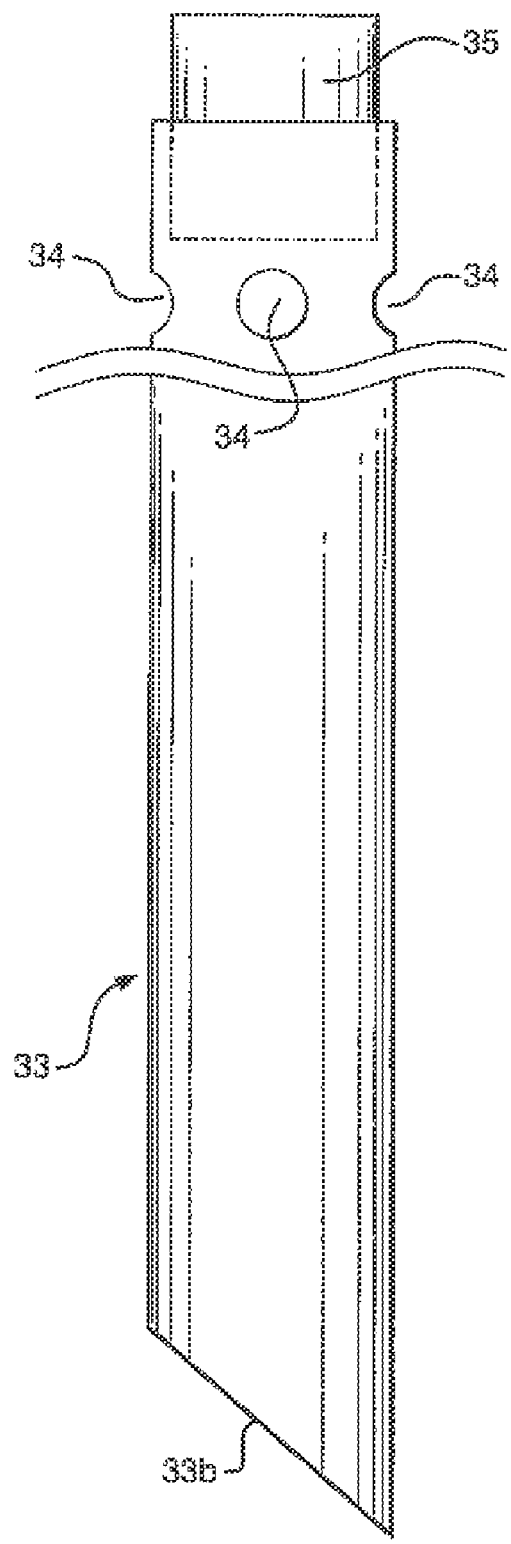
FIG. 7 is a side view of a wand of the cover system shown in FIGS. 1-6.

The system 10 can also include a wand 33 formed from a length of tubing, as shown in FIGS. 1 and 7. A first end 33a of the wand 33 can be connected to a first end of a nipple 35 (depicted in FIG. 7) by a suitable means such as clamps or threads (not shown). A second end of the nipple 35 can be connected to the fitting 28 by a suitable means such as clamps or threads, so that the wand 33 is in fluid communication with the fitting 28. The wand 33 can be connected to the fitting 28 using other means in alternative embodiments. The wand 33 can be connected directly to the fitting 28 in other alternative embodiments.

The inner diameter of the wand 33 can be approximately two inches. The optimal value for the inner diameter of the wand 33 is application dependent, and can vary with factors such as the maximum desired rate at which the catalyst and/or additive 11 is to be unloaded from the drum 12; a specific value for the inner diameter is disclosed for exemplary purposes only.

The length of the wand 33 is preferably chosen so that a second end 33b of the wand 33 is located proximate a bottom surface 12a of the drum 12 when the cover 14 is installed on the drum 12, as shown in FIG. 1. Preferably, the lowermost point of second end 33b is located not more that approximately one-half inch from the bottom surface 12a when the cover 14 is installed on the drum 12.

The second end 33b of the wand 33 is preferably angled in relation to the longitudinal axis of the wand 33, as depicted in FIGS. 1 and 7. This feature can increase the effective area through which the catalyst and/or additive 11 is drawn into the wand 33. Moreover, it is believed that the angled orientation of the second end 33b in relation to the bottom surface 12a of the drum 12 can minimize the potential for the opening defined by the second end 33b to become plugged with the catalyst and/or additive 11. Also, the angled orientation of the second end 33b is believed to reduce the potential for a vacuum lock to form between the second end 33b and the bottom surface 12a.

One or more holes are preferably formed in the wand 33, proximate the first end 33a. Most preferably, four circular holes 34 are formed in the wand 33 at equally-spaced angular positions around the circumference of the wand 33, as shown in FIGS. 1 and 7. Each of the holes 34 preferably has a diameter of approximately 0.25 inch (6.4 mm), and is preferably located approximately 0.75 inch (19.1 mm) from the cover 14 when the wand 33 is installed on the cover 14. The holes 34, it is believed, can act as vacuum relief ports that further reduce the potential for a vacuum lock to form between the second end 33b of the wand 33 and the bottom surface 12a of the drum 12.

Specific values for the diameter of the holes 34, and for relative positions of the holes 34 on the wand 33 are presented for exemplary purposes only; the holes 34 can be sized and positioned differently in alternative embodiments. Moreover, the holes 34 can have a shape other than circular in alternative embodiments.

The fitting 28 can mate with an associated one of the hoses 138 using clamps, couplings, or other suitable means. As discussed above, the hose 138 can be connected to an associated valve 142 of the loader 102. The hose 138, fitting 28, and wand 33 thus place the internal volume 126 of the dust collector 116 in fluid communication with the volume 25 defined by the drum 12 and the cover 14.

The use of the hose 138 to place the volume 25 in fluid communication with the loader 102 is disclosed for exemplary purposes only. Other suitable conveying means, such as hard piping, can be used in the alternative. Moreover, multiple lengths of hose connected by fittings or other suitable means can be used in lieu of the single hose 138.

Figure 10A:
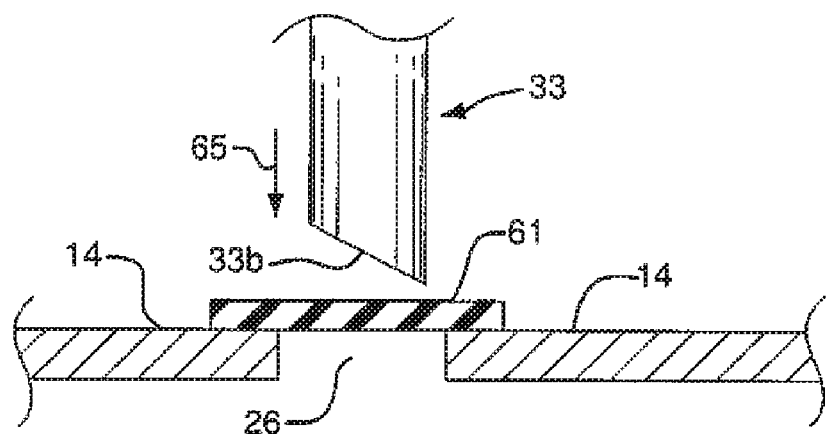
FIG. 10A is a side view of an alternative embodiment of the cover system shown in FIGS. 1-8, depicting a wand of the cover system about to pierce a membrane of the cover system.
Figure 10B:
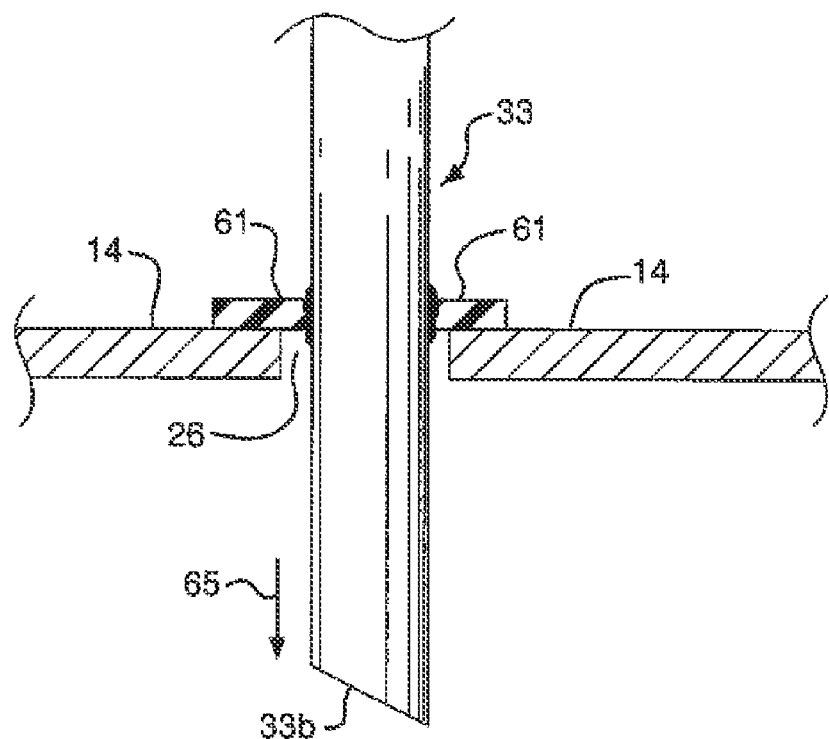
FIG. 10B is a side view of the cover system shown in FIG. 10A, depicting the wand after the wand has pierced the membrane.

Alternative embodiments of the cover system 10 can include a membrane 61 of sealable material, as shown in FIGS. 10A and 10B. The membrane 61 can be secured to the cover 14 so that the membrane 61 spans the opening 26. The sealable material of the membrane 61 can be pierced by the second end 33b of the wand 33 as the wand 33 is inserted through the opening 26 after the cover 14 has been placed on the drum 12, as denoted by the arrows 65 in FIGS. 10A and 10B. The sealable material is sufficiently resilient, malleable, and/or controllable to create a seal between the outer circumference of the wand 33 and the remaining portion of the membrane 61. The use of the membrane 61 can obviate the need to secure the fitting 28 to the cover 14 using the rings 30.

The system 10 preferably includes a vacuum relief mechanism 40. The vacuum relief mechanism 40 can be attached to a fitting 41. The fitting 41 can extend through a second penetration point or opening 42 formed in the cover 14 and shown in FIG. 6, so that the vacuum relief mechanism 40 is in fluid communication with the volume 25 by way of the fitting 41.

The fitting 41 can be secured to the cover 14 using a suitable means such as threaded rings 44 that engage complementary threads formed on the fitting 41 as shown, for example, in FIG. 1. Gaskets (not shown) or other suitable means can be used to seal the interface between the rings 44, the cover 14, and the fitting 41. Other means for securing the fitting 41 to the cover 14 can be used in the alternative, including, for example, a plastic inset that securely engages the fitting 41 and the periphery of the second opening 42.

Figure 8B:
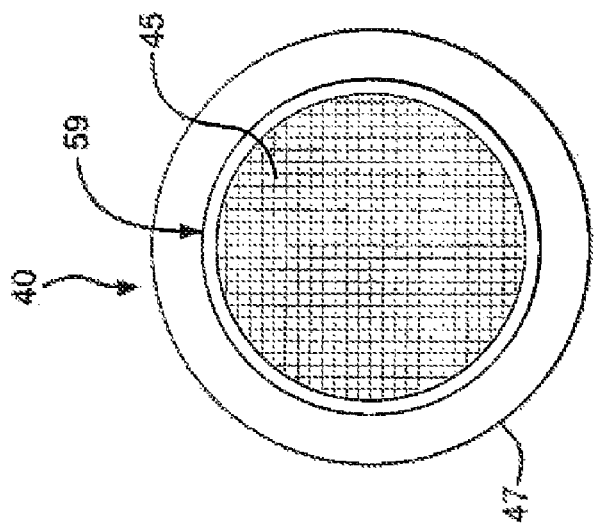
FIG. 8B is a front view of the vacuum relief mechanism shown in FIG. 8A.
Figure 8A:
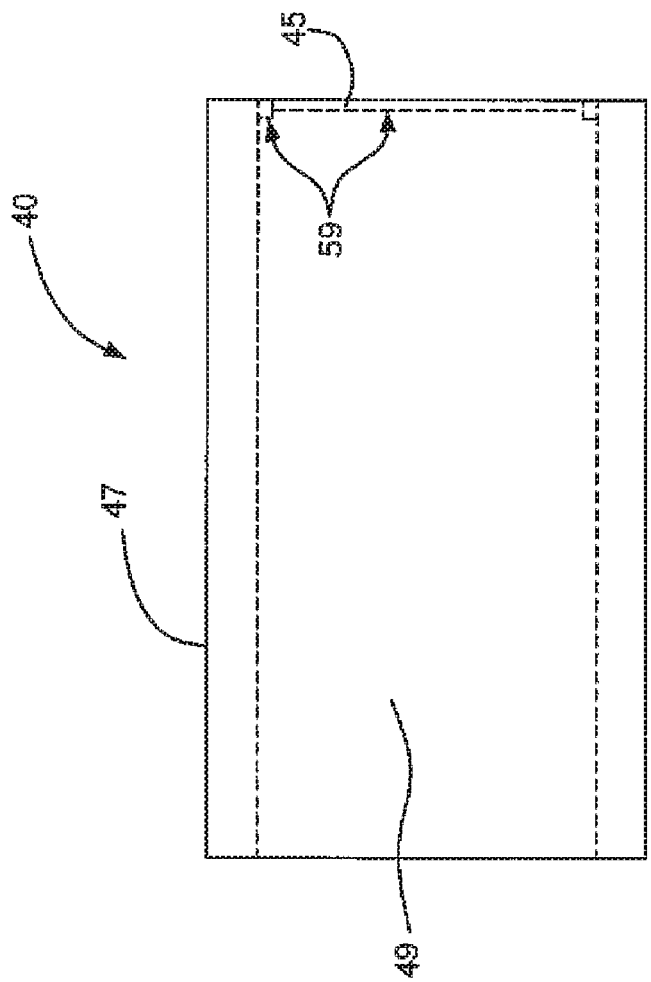
FIG. 8A is a side view of a vacuum relief mechanism of the cover system shown in FIGS. 1-7.

The vacuum relief mechanism 40 can include, for example, a housing 47 and a fitting 59 attached to the housing, as shown in FIGS. 8A and 8B. The housing 47 has an internal passage 49 formed therein. The fitting 59 includes a screen 45. The fitting 59 is positioned on the housing 47 so that the screen 45 spans one end of passage 49. The screen 45 can be, for example, a 40-mesh screen; screens having a mesh other than 40 can be used in the alternative.

A first end of the housing 47 is connected to the fitting 41 by a suitable means such as threads, so that the passage 49 is in fluid communication with the internal volume 25 of the drum 12. An elbow 55 can be connected to the second end of the housing 47. The elbow 55 faces downward, to discourage the influx of contaminates such as rain through the vacuum relief mechanism 40.

The screen 45 permits air from the ambient environment to enter the internal volume 25 by way of the passage 49 and the fitting 41, while preventing the influx of foreign matter such as leaves, rodents, etc. The vacuum relief mechanism 40 thus acts as a vacuum breaker that can help to ensure that the pressure differential between the internal volume 25 and the ambient environment does not exceed the structural limits of the drum 12 or the cover 14.

The use of a vacuum relief mechanism 40 employing a screen is disclosed for exemplary purposes only. Other types of vacuum relief mechanisms can be used in the alternative.

The fitting 41 is preferably configured to accommodate a vacuum gauge 46 that provides an indication of the vacuum within the volume 25 as the drum 12 is being unloaded. The vacuum gauge is depicted in FIGS. 1-5.

The fitting 41 can also be configured to accommodate a pressure relief valve 51 shown in FIGS. 1-5. The fitting 41 can be a T-shaped fitting that places each of the vacuum gauge 46, the pressure relief valve 51, and the vacuum relief mechanism 40 in fluid communication with the internal volume 25. A first end of the pressure relief valve 51 can be connected to the fitting 41 by a suitable means such as threads. An elbow 63 can be connected to a second end of the pressure relief valve 51, to discourage the influx of contaminates such as rain.

The pressure relief valve 51 can relieve the pressure within the internal volume 25 when the pressure within the internal volume exceeds the pressure of the ambient air by a predetermined amount. This situation can occur, for example, when the drum 12 inadvertently pressurized, or when the catalyst and/or additive 11 within the drum 12 becomes heated, causing evaporation of volatiles from the catalyst and/or additive 11. A pressure relief valve suitable for use as the pressure relief valve 51 can be obtained, for example, from Circle Seal Controls, Inc., of Corona, Calif. as the 500 Series Adjustable Popoff & Inline Relief Valve.

Alternative embodiments of the cover system 10 can be configured without the vacuum relief mechanism 40, the vacuum gauge 46, and/or the pressure relief valve 51.

The use of a T-shaped fitting 41 to accommodate the vacuum gauge 46, the pressure relief valve 51, and the vacuum relief mechanism 40 is disclosed for exemplary purposes only. Other types of fittings can be used in the alternative. Moreover, each of the vacuum gauge 46, the pressure relief valve 51, and the vacuum relief mechanism 40 can be accommodated by its own individual fitting mounted on the cover 14, in alternative embodiments.

The internal volume 25 can be placed in fluid communication with a source of a gas, such as nitrogen, that will not react with the catalyst and/or additive 11. This feature can permit the volume 25 to be filled with a blanket of nitrogen gas as the catalyst and/or additive 11 is drawn out of the drum 12. The connection with the source of nitrogen gas can be facilitated by, for example, a fitting 53 mounted on the cover 14, and a length of hose 139 connected to the fitting 41 as depicted in FIGS. 1-5. The fitting 53 can extend through the cover 14 by way of a port or opening 57 formed therein; the opening 57 is depicted in FIG. 6. Alternative embodiments of the cover system 10 can be configured without the fitting 53 and the hose 139.

The system 10 preferably includes a means for supporting the drum 12 in a tilted orientation as the drum 12 is unloaded. For example, the system 10 can include a cradle 50, depicted in FIG. 1. The cradle 50 is preferably configured so that a longitudinal or central axis "C1" of the drum 12 is angled less than approximately ninety degrees in relation to the vertical direction when the drum 12 is positioned on the cradle 50. More preferably, the cradle 50 is configured so that the longitudinal axis C1 is angled between approximately twenty to approximately sixty degrees in relation to the vertical direction.

Tilting the drum 12 can help ensure that a substantial entirety of the catalyst and/or additive 11 is drawn out of the drum 12. More particularly, the drum 12 is preferably positioned on the cradle 50 so that the second end 33b of the wand 33 is located at approximately the 6:00 o'clock position, when viewed from a perspective rotated ninety degrees from the perspective of FIG. 1. Moreover, the first opening 26 is located proximate the outer perimeter of the cover 14, as noted previously. This feature helps to position the second end 33b of the wand 33 proximate the lowest point of the drum 12 when the drum 12 is oriented as noted.

The tilted orientation of the drum 12 causes the catalyst and/or additive 11 in the drum 12 to be drawn toward the lowest point of the drum 12 by gravity as the drum 12 is emptied. Positioning the second end of the wand 33b proximate the lowest point of the drum 12 can thus help to ensure that a maximal amount of the catalyst and/or additive 11 is drawn out of the drum 12.

The use of the cradle 50 to support the drum 12 in a tilted orientation is disclosed for exemplary purposes only. Other means for tilting the drum 12 can be used in the alternative. For example, the drum 12 can be placed on a ramp having an inclined surface. As a further example, the drum 12 can be placed on a hand-truck or other carrying device and held in a tilted orientation during the unloading process.

The drum 12 can be used to hold the catalyst and/or additive 11 during transport to the refinery or other point of use, i.e., the drum 12 can be used as a shipping container. The drum 12 can also be used to store the catalyst and/or additive 11 at the refinery or other point of use until the catalyst and/or additive 11 is needed. A conventional cover can be installed on the drum 12 during shipping and storage.

The drum 12 can be moved to a location at which the hose 138 can be connected to the fitting 28. Alternatively, the hose 138 can be connected to the drum 12 where the drum 12 is stored, thereby obviating the need to move the drum 12 from the storage area.

The cover used for shipping and storage can be removed from the drum 12. The cover 14, with the fitting 28, wand 33, vacuum relief mechanism 40, fitting 41, pressure relief valve 51, and vacuum gauge 46 mounted thereon, can then be installed as depicted, for example, in FIGS. 2-5. The cover 12 can be moved with a side to side or circular motion help drive the wand 33 downward into the catalyst and/or additive 11.

In alternative embodiments equipped with the membrane 61 of sealable material, the wand 33 can be inserted through the membrane 61 and into the catalyst and/or additive 11 after the cover 14 has been placed on the drum 12. The sealable material, a discussed above, is pierced by the wand 33, and forms a seal around the outer circumference of the wand 33.

The compression ring 18 can be installed once the cover 14 has been placed on the drum 12. The compression ring 18 can be tightened to drive the lip 20 of the cover 14 and the ring 22 of the drum 12 together, substantially sealing the interface between the cover 14 and the drum 12. The hose 138 can be connected to the fitting 28, to place the internal volume 25 in fluid communication with the loader 102. The hose 139 can be connected to the fitting 53 to place the internal volume 25 in fluid communication with the source of nitrogen, if the cover system 10 is configured to provide a nitrogen blanket within the internal volume 25 during the unloading process.

The drum 12 is preferably placed on the cradle 50 or other supporting means after the cover system 10 has been installed, to help minimize the possibility of spillage of the catalyst and/or additive 11 during the installation process.

The hose 138, as discussed above, is in fluid communication with a vacuum source, such as the dust collector 116 of the loader 102, on a selective basis. The valve 142 of the loader 102 can be opened when the electronic controller of the loader 102 determines that the injection sequence for the particular catalyst and/or additive 11 in the drum 12 is to commence. The vacuum within the dust collector 116 draws the particulate substance from the drum 12 by way of the hose 138, fitting 28, and wand 33. The path of travel of the catalyst and/or additive 11 is denoted by the arrows 143 in FIGS. 1 and 9.

The fitting 53 and the hose 139 allow the nitrogen gas to be drawn into the volume 25 within the drum 12 as the catalyst and/or additive 11 is removed. The path of travel of the nitrogen gas is denoted by the arrows 147 in FIG. 1. Replacing the catalyst and/or additive 11 with a blanket of nitrogen gas can reduce the potential for contamination of the catalyst and/or additive 11, particularly in applications where the entire amount of the catalyst and/or additive 11 in the drum 12 is not transferred to the loader 102 in a single operation, i.e., where some of the catalyst and/or additive 11 remains in the drum 12 for transfer at a later time.

One, or more than one of the drums 12 can be connected to the loader 102 at one time, as discussed above. If desired, three cover systems 10 can be installed on three drums 12 that each hold a different type of catalyst and/or additive 11. The catalyst and/or additive 11 can be transferred to the loader 10 from each of the three drums 12 on a sequential basis, using the above-described process.

The cover system 10 can permit a particulate substance, such as the catalyst and/or additive 11, to be unloaded from a container, such as the drum 12, without damaging the container due to an excessive pressure differential between the interior of the container and the ambient environment. Unloading a container while it is covered can substantially reduce the potential for fugitive emissions and other losses of the particulate substance during the unloading process. Unloading a container in this manner can also reduce the potential for human exposure to the particulate substance. Eliminating human exposure and fugitive emissions can be particularly beneficial, for example, in applications where the particulate substance is toxic, caustic, or otherwise harmful to humans or the environment.

Moreover, the ability to unload a container while the particulate substance therein is substantially isolated from the ambient environment can minimize the potential for contamination of the particulate substance. The use of the cover system 10 can thus be especially beneficial, for example, in applications where the particulate substance possesses hygroscopic properties. More specifically, the cover system 10, by isolating the particulate substance from the ambient environment, can minimize or substantially eliminate the absorption of water by a hygroscopic material during the unloading process.

By "hygroscopic," it is meant having the property of absorbing atmospheric moisture. Hygroscopic materials include, but are not limited to, food products, pharmaceuticals and industrial chemicals, as well as catalyst and/or additives, e.g., FCC catalysts and/or additives.

The ability of the cover system 10 to substantially isolate a particulate substance within a container from the ambient environment can also be beneficial, for example, in applications where the particulate substance possesses pyrophoric, i.e., spark or flame inducing, properties. It should be noted that the cover system 10 can be used in connection with particulate substances other than pyrophoric and/or hygroscopic materials.

The use of the cover system 10 can permit the particulate substance to be transferred directly to its point of use, e.g., the loader 102, without a need to transfer the particulate substance to an intermediate vessel from which the particulate substance is subsequently be transferred.

The cover system 10 is believed to be particularly well suited for use with relatively small, mobile loaders, such as the loader 102, as these types of loaders are well suited to draw particulate matter from storage drums rather than large storage hoppers or rail cars. Moreover, the use of the cover system 10 can permit one or more of the drums 12 to be unloaded at a site remote from the loader 102, in relatively quick succession. It should be noted that the cover system is not limited to use with small, mobile loaders; the cover system 10 can be used in connection with relatively large and/or stationary loaders.

The foregoing description is provided for the purpose of explanation and is not to be construed as limiting the invention. Although the invention has been described with reference to preferred embodiments or preferred methods, it is understood that the words which have been used herein are words of description and illustration, rather than words of limitation. Furthermore, although the invention has been described herein with reference to particular structure, methods, and embodiments, the invention is not intended to be limited to the particulars disclosed herein, as the invention extends to all structures, methods and uses that are within the scope of the appended claims. Those skilled in the relevant art, having the benefit of the teachings of this specification, may effect numerous modifications to the invention as described herein, and changes may be made without departing from the scope and spirit of the invention as defined by the appended claims.

What is claimed:

1. A cover system for a container suitable for particulate matter, comprising a cover that mates with the container, a wand capable of drawing particulate matter through a hole formed in the cover, a fitting mounted in the hole formed in the cover, the wand connected to the fitting in a manner such that wand is capable of penetrating particulate matter in the container as the cover is mated with the container, and a cradle capable of holding the container in a tilted orientation.

2. The system of claim 1, further comprising a pressure relief mechanism connected to the fitting.

3. The system of claim 2, further comprising a vacuum gauge connected to the fitting.

4. The system of claim 3, further comprising a pressure relief valve connected to the fitting, wherein the fitting is a T-shaped fitting, and the vacuum gauge is also connected to the T-shaped fitting.

5. The system of claim 2, wherein the vacuum relief mechanism comprises a housing having a passage formed therein, the passage being in fluid communication with the fitting; and a screen mounted in the passage.

6. The system of claim 1, wherein the cradle holds the container so that a central axis of the container is angled less than approximately ninety degrees in relation to the vertical direction.

7. The system of claim 6, wherein the cradle holds the container so that the central axis of the container is angled between approximately twenty to approximately sixty degrees in relation to the vertical direction.

8. The system of claim 1, wherein the fitting extends through the hole formed in the cover.

9. The system of claim 8, wherein the wand has a plurality of holes formed at a location proximate the wand's connection to the cover.

10. The system of claim 9, wherein the holes are substantially circular and are equally spaced around a circumference of the wand.

11. The system of claim 1, wherein an end of the wand is angled in relation to a longitudinal axis of the wand.

12. The system of claim 1, wherein the wand is tubular.

* * * * *